US009909581B2

(12) United States Patent
Lilie

(10) Patent No.: US 9,909,581 B2
(45) Date of Patent: Mar. 6, 2018

(54) THERMAL INSULATION SYSTEM FOR THE DISCHARGE OF GAS IN A REFRIGERATION COMPRESSOR

(71) Applicant: Whirlpool S.A., São Paulo (BR)

(72) Inventor: Dietmar Erich Bernhard Lilie, Joinville (BR)

(73) Assignee: Whirlpool S.A., Sao Paulo (BR)

( * ) Notice: Subject to any disclaimer, the term of this patent is extended or adjusted under 35 U.S.C. 154(b) by 199 days.

(21) Appl. No.: 14/433,188

(22) PCT Filed: Oct. 2, 2013

(86) PCT No.: PCT/BR2013/000394
§ 371 (c)(1),
(2) Date: Apr. 2, 2015

(87) PCT Pub. No.: WO2014/053040
PCT Pub. Date: Apr. 10, 2014

(65) Prior Publication Data
US 2015/0275883 A1    Oct. 1, 2015

(30) Foreign Application Priority Data
Oct. 3, 2012    (BR) ........................... 1020120252732

(51) Int. Cl.
*F04B 53/10*    (2006.01)
*F04B 39/00*    (2006.01)
(Continued)

(52) U.S. Cl.
CPC ...... *F04B 53/1085* (2013.01); *F04B 39/0027* (2013.01); *F04B 39/0055* (2013.01);
(Continued)

(58) Field of Classification Search
CPC ...... F04B 39/12; F04B 39/123; F04B 39/125; F04B 39/0027; F04B 39/0055;
(Continued)

(56) References Cited

U.S. PATENT DOCUMENTS 2,620,125 A * 12/1952 Kilchenmann ..... F04B 11/0025
123/65 V
2007/0148025 A1 * 6/2007 Higashi ............... F04B 39/1073
417/559
(Continued)

FOREIGN PATENT DOCUMENTS

DE          3607517 A1    9/1986
DE    102004054328 A1    6/2005
(Continued)

OTHER PUBLICATIONS

International Search Report, International Applicaiton No. PCT/BR2013/000394, filed Oct. 2, 2013.

*Primary Examiner* — Bryan Lettman
(74) *Attorney, Agent, or Firm* — Harrington & Smith

(57) ABSTRACT

A compressor includes: a cylinder crankcase defining a cylinder closed by a valve plate provided with at least one discharge orifice; a cylinder cap seated against the valve plate and in the interior of which is defined a discharge chamber. A hollow body defines at least one plenum mounted internal to the cylinder cap, maintaining a gap with the latter. The hollow body is seated against the valve plate, preventing the direct contact thereof with the inner volume of the hollow body, the latter being provided with an inlet nozzle communicating the plenum with the discharge orifice of the valve plate, and with an outlet nozzle communicating the plenum with a gas outlet of the cylinder cap.

10 Claims, 4 Drawing Sheets

(51) Int. Cl.
*F04B 53/00* (2006.01)
*F04B 53/16* (2006.01)
*F16K 15/16* (2006.01)
*F04B 39/12* (2006.01)
*F04B 39/06* (2006.01)
*F04B 39/14* (2006.01)

(52) U.S. Cl.
CPC ........ *F04B 39/0061* (2013.01); *F04B 39/064* (2013.01); *F04B 39/121* (2013.01); *F04B 39/123* (2013.01); *F04B 39/125* (2013.01); *F04B 53/001* (2013.01); *F04B 53/007* (2013.01); *F04B 53/1037* (2013.01); *F04B 53/16* (2013.01); *F16K 15/16* (2013.01); *F04B 39/06* (2013.01); *F04B 39/14* (2013.01)

(58) Field of Classification Search
CPC .............. F04B 39/0061; F04B 39/0088; F04B 53/001; F04B 53/007; F04B 53/16; F04B 53/162; F04B 53/10; F04B 53/1037; F04B 53/1047; F04B 53/105; F04B 53/1085; F04B 39/06; F04B 39/121; F16K 15/16
See application file for complete search history.

(56) References Cited

U.S. PATENT DOCUMENTS

| | | | |
|---|---|---|---|
| 2008/0260561 A1* | 10/2008 | Ribas | F04B 39/064 417/569 |
| 2010/0226805 A1 | 9/2010 | Kulmer | |
| 2010/0310389 A1* | 12/2010 | Alvarenga | F01N 1/089 417/312 |
| 2012/0063937 A1* | 3/2012 | Moreira | F04B 39/0061 417/437 |

FOREIGN PATENT DOCUMENTS

| | | |
|---|---|---|
| WO | 2009079727 A1 | 7/2009 |
| WO | 2010025534 A1 | 3/2010 |

* cited by examiner

THERMAL INSULATION SYSTEM FOR THE DISCHARGE OF GAS IN A REFRIGERATION COMPRESSOR

CROSS-REFERENCE TO RELATED APPLICATIONS

This application is the U.S. national phase of PCT/BR2013/000394 filed Oct. 2, 2013, which claims priority of Brazil Patent Application 10 2012 025273 2 filed Oct. 3, 2012, which is incorporated herein by reference.

FIELD OF THE INVENTION

The present invention refers to a thermal insulation system to be applied to the discharge of gas in a refrigeration compressor, for example, of the reciprocating hermetic type, which is particularly driven by a linear motor, and to a compressor comprising said system.

BACKGROUND OF THE INVENTION

One of the variables which limit the increase of efficiency and capacity in the compressors is overheating. The limitation comes from the thermal exchange between the gas being drawn through the evaporation line and the interior of the compressor, causing the increase in the refrigerant temperature before compression. This situation results in loss of capacity and, consequently, in loss of efficiency. The discharge system, usually presenting a high temperature, contributes to increase the thermal profile of the compressor. Therefore, insulating the discharge heat results in reducing the thermal profile as a whole and, most importantly, of the temperature in which the gas is compressed. Usually, the strategy to prevent the gas from overheating is to improve the suction insulation.

However, there are known solutions aiming the thermal insulation of the discharge in refrigeration compressors. Among said solutions, US2010/0226805 (ACC) discloses a discharge line in which is provided a discharge tube in plastic material, and a tubular sleeve, in plastic or polymer, for example, PTFE, which is located surrounding a portion of the discharge tube, in the region the latter passes through the discharge tube located in the compressor housing, such tube being metallic in this prior solution. Although this solution presents a small reduction in the heat transmission to the interior of the compressor, it has the drawback of preventing only the transmission of heat of the discharge gas, in the discharge tube, to the interior of the environment of the hermetic housing, considering that said discharge tube is usually metallic and of large extension, in order to absorb the vibrations between the compressor assembly and the hermetic housing. This prior solution does not prevent the discharge gas heat, which is released to the discharge chamber inside the cylinder cap, from being transferred to the head region of the compressor and to the remaining of the metallic parts of the assembly, particularly to the cylinder crankcase, contributing to the undesired heating of the gas to be compressed.

Another known solution (DE102004054328—Denso) provides a discharge chamber internally provided with a thermal insulating means in the form of an inner lining directly seated against the inner wall of the discharge chamber. This prior solution has the drawback of allowing for a certain thermal exchange, through conduction, between the gas contained inside the discharge chamber and the cylinder cap, considering that the proposed thermal insulation takes the form of a lining applied internally to the cylinder cap, without any spacing between said thermal insulation and the metallic material of the cylinder cap. This technical solution is not able to provide an effective thermal insulation between the gas being released to the interior of the discharge chamber and the assembly formed by the metallic structure of the cylinder cap, valve plate and cylinder crankcase.

SUMMARY OF THE INVENTION

Due to the drawbacks of the prior solutions, the present solution has the objective of providing an effective thermal insulation system for the discharge of a compressor, which is able to substantially reduce the transfer of heat, to the cylinder cap and to the rest of the compressor, from the refrigerant fluid under high temperature pumped by the compressor, improving the efficiency of the latter.

Another object of the present invention is to provide a thermal insulation system for the discharge of the compressor, such as mentioned above, of easy construction and assembly, particularly but not exclusively, in a compressor of the type having a linear motor.

An additional object is to provide a refrigeration compressor including a thermal insulation system as mentioned above.

These objectives are achieved by means of a thermal insulation system for the discharge of gas in a refrigeration compressor of the type comprising: a cylinder crankcase defining a cylinder which is closed, at one end, by a valve plate provided with at least one discharge orifice and defining, with the cylinder, a compression chamber; a cylinder cap having a gas outlet and seated against the valve plate in opposition to the compression chamber and inside which is defined a discharge chamber; and a discharge tube communicating the gas outlet of the cylinder cap with the exterior of the compressor.

The thermal insulation system of the present invention comprises a hollow body defining, in its interior, at least one plenum and which is mounted, in an indexed manner, in the interior of the cylinder cap, maintaining with the latter a hermetic gap and being seated against the valve plate, preventing the direct contact of the latter with the internal volume of the hollow body, which is provided with an inlet opening communicating the plenum with the discharge orifice of the valve plate, and with an outlet opening communicating the plenum with the gas outlet of the cylinder cap.

According to a possible way of carrying out the invention, the hollow body may be formed of a thermal insulating material.

The construction proposed by the present invention allows the gas, which is pumped by the compressor to the interior of the discharge chamber, to remain insulated from the cylinder cap by the gap defined between the hollow body and the cylinder cap. Furthermore, the hollow body is seated on the valve plate, allowing the gas contained therewithin to be maintained in communication only with the discharge orifice of the valve plate, and not with the remaining of the surface of the latter facing the cylinder cap. In the case of using a hollow body formed in thermal insulating material, the gas pumped by the compressor to the interior of the discharge chamber will be additionally insulated from the cylinder cap by the thickness of the wall of said hollow body in thermal insulating material.

BRIEF DESCRIPTION OF THE DRAWINGS

The invention will be described below, with reference to the enclosed drawings, given by way of example of a way of carrying out the invention, and in which.

DESCRIPTION OF THE INVENTION

Figure 1:
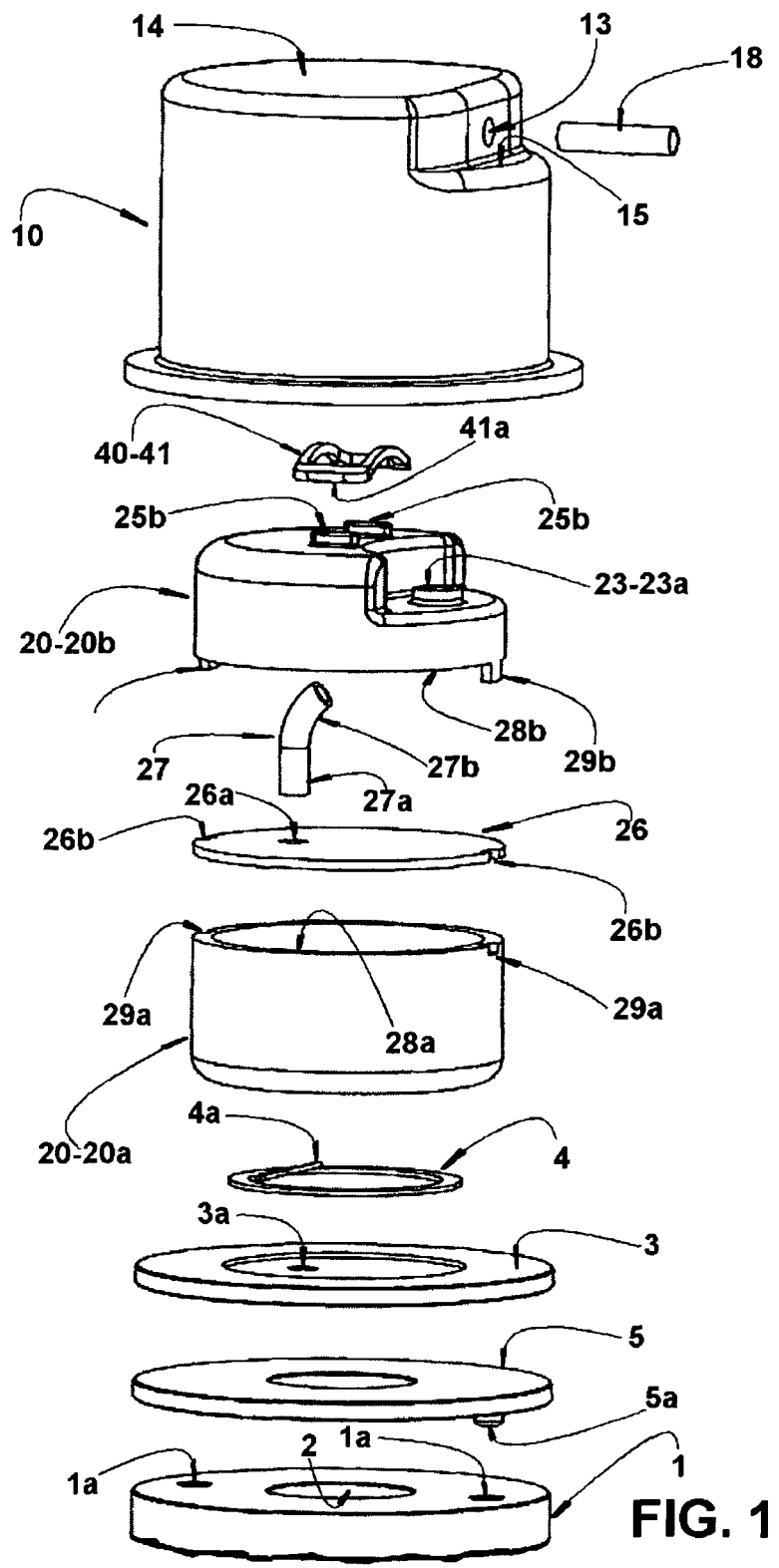
FIG. 1 represents an exploded perspective view of the assembly formed by the cylinder cap, by the hollow body in multiple parts, by a discharge valve, by the valve plate and by sealing gaskets, constructed according to the subject system.
Figure 2:
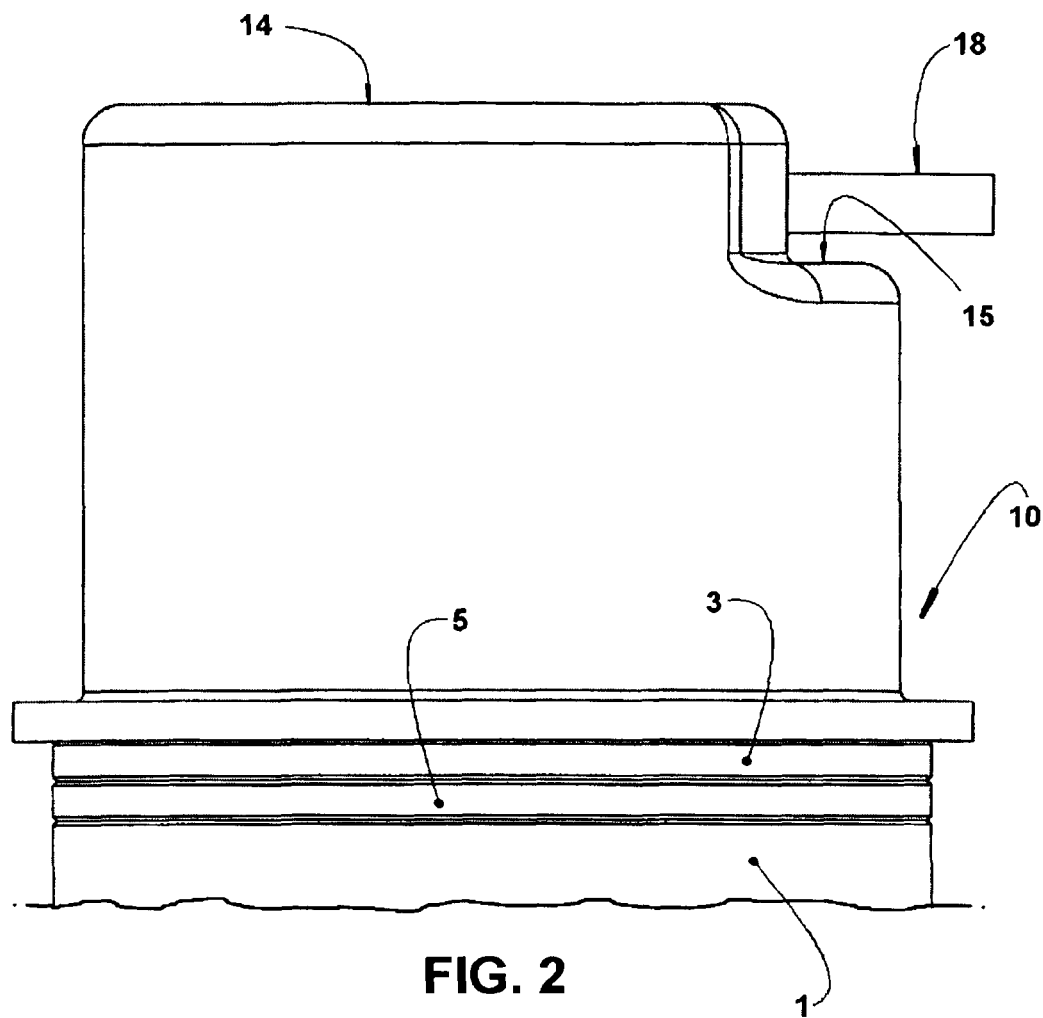
FIG. 2 represents a lateral view of the assembly illustrated in FIG. 1, with the component parts in the assembled condition.
Figure 3:
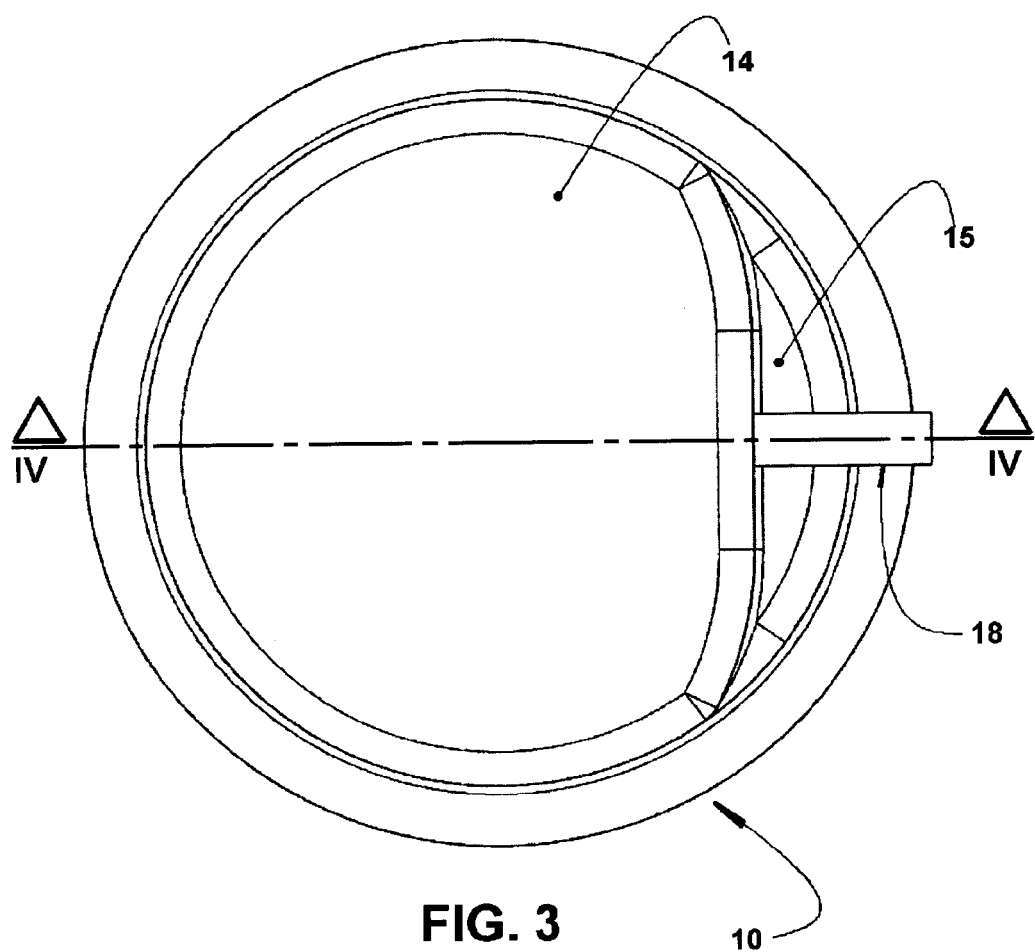
FIG. 3 represents an end view of the assembly illustrated in FIG. 2, taken from the outer end of the cylinder cap.

The present invention will be described for a refrigeration compressor of the reciprocating hermetic type and comprising a motor-compressor assembly (not illustrated), including a cylinder crankcase 1 (partially illustrated in FIG. 4), which defines a cylinder 2 inside which a piston is axially displaced (not illustrated), by action of a rotary or linear electric motor.

The cylinder crankcase 1 may be built in any suitable metal alloy, well known in the state of the art.

The cylinder 2 has an open end, through which the piston is mounted, and an opposite end (illustrated in FIG. 4), closed by a valve plate 3, against which is seated a usually metallic cylinder cap 10. The valve plate 3 is built in a metal alloy, in order to operate together with at least one suction valve, not illustrated, facing the interior of the cylinder 2, and with at least one discharge valve 4 which, in the illustrated example, takes the form of a single plate incorporating a metallic flexible blade 4a, operating in association with a respective discharge orifice 3a of the valve plate 3. It should be understood that the discharge valve may take the form of a single plate incorporating a plurality of flexible blades, each operating in association with a respective discharge orifice provided in the valve plate 3.

The valve plate 3 is seated on the cylinder crankcase 1, by means of an annular sealing gasket 5. Although not illustrated in the drawings, it may be further provided another annular sealing gasket located between the cylinder cap 10 and the adjacent face of the valve plate 3.

The cylinder cap 10 is seated against one face of the valve plate 3, opposite to that seated against the cylinder crankcase 1. The cylinder cap 10 defines, with the adjacent face of the valve plate 3, a discharge chamber 11, which maintains a selective fluid communication with the cylinder 2, through the discharge orifice 3a or through the multiple discharge orifices, if existent, upon the opening of the discharge valve 4, and a constant fluid communication with a discharge side of a refrigeration system to which the compressor is associated, through a discharge tube (not illustrated), which connects said discharge chamber 11 to the exterior of the compressor.

The cylinder cap 10 takes the form of a cup, with its open base seated on the valve plate 3 and defining a gas inlet 12 in fluid communication with the discharge orifice 3a, and a gas outlet 13, coupled to the discharge tube which communicates said gas outlet 13 with the exterior of the compressor.

In the illustrated construction, the cylinder cap 10 is provided with an end wall 14, opposed to its open base and to the valve plate 3. In the illustrated embodiment, the gas outlet 13 is provided in a chamfered region 15 of the end wall 14 and located facing laterally outwards of the cylinder cap 10. However, said positioning of the gas outlet 13 should not be limited to the illustrated embodiment, and the gas outlet 13 may be provided in the end wall 14 of the cylinder cap 10.

The present invention provides a thermal insulation system to be applied to the discharge of gas in a compressor, said system comprising a hollow body 20, preferably but not necessarily, formed of a thermal insulating material, defining at least one plenum 21 therein and mounted, in an indexed manner, inside the cylinder cap 10, keeping with the latter a gap 30 and being seated against the valve plate 3, preventing the direct contact of the latter with the internal volume of the hollow body 20.

According to the present invention, the plenum 21 of the hollow body 20 effectively acts as a discharge chamber. The discharge chamber 11 of the cylinder cap 10 acts, in this embodiment, in the definition of the volume of the gap 30 between the inner walls of the cylinder cap 10 and the hollow body 20. The assembly of the cylinder cap 10 and hollow body 20 may be carried out in order to make the gap 30 hermetic in relation to the interior of the hollow body 20 and to the exterior of the cylinder cap 10.

The hollow body 20 is provided with an inlet nozzle 22, open to the plenum 21 and to the discharge orifice 3a of the valve plate 3, and with an outlet nozzle 23, communicating the plenum 21 with the gas outlet 13 of the cylinder cap 10.

In the illustrated embodiment, the hollow body 20 comprises a base end wall 24 to be seated against the valve plate 3, in order to secure thereto the discharge valve 4 and to define a stop for the latter, with the inlet nozzle 22 being provided in said base end wall 24 and open to the discharge orifice 3a of the valve plate 3.

In the illustrated embodiment, the annular sealing gasket 5 is provided with at least two diametrically opposite eccentric axial projections 5a, which are dimensioned to be fitted in respective recesses 1a defined in a confronting face of the cylinder crankcase 1, allowing for the correct indexation in the seating of the annular sealing gasket 5 against the cylinder crankcase 1.

Although not illustrated herein, the base end wall 24 may incorporate a plurality of base projections facing outwards the hollow body 20, indexing the hollow body in relation to the valve plate 3 and also in relation to the annular sealing gasket 5 and to the cylinder crankcase 1.

The inlet nozzle 22 of the hollow body 20 comprises a base opening 22a provided in the base end wall 24, and a tubular projection 22b which extends from the base end wall 24 to the interior of the hollow body 20, around the base opening 22a thereof.

In the illustrated embodiment, an annular region 22c of the base wall 24 surrounding the base opening 22a of the inlet nozzle 22 is constructed so as be axially spaced from the valve plate 3, defining a stop for the opening of the flexible blade 4a of the discharge valve 4. In a particular and preferred manner, said annular region 22c of the base wall 24 is located inclined radially inwards and axially inwards the hollow body 20, defining an inclined opening stop against which is seated the flexible blade 4a upon the opening of the discharge valve 4.

Further according to the illustrated embodiment, the tubular projection 22b of the inlet nozzle 22 presents a frusto-conical configuration, with the larger base open and facing the interior of the hollow body 20. This constructive arrangement of the inlet nozzle 22 reduces the discharge power (consumption in the discharge process) and minimizes the pulsation transients.

The hollow body 20 comprises a top end wall 25 in which is provided the outlet nozzle 23 of the hollow body 20, said outlet nozzle 23 being open to the gas outlet 13 of the cylinder cap 10.

The outlet nozzle 23 of the hollow body 20 comprises an outer tubular projection 23a which extends outside from a lowered region 25a of the top end wall 25 of the hollow body 20, to be fitted in a tubular passage 16 formed internally to the end wall 14 and which is open to the outlet opening 13 of the cylinder cap 10. In the illustrated embodiment, the outlet opening 13 of the cylinder cap 10 is configured to receive and secure, in its interior and by any suitable means, such as for example threads, adhesives or brazing, a tubular connector 18 which projects outside from the outlet opening 13, in order to be coupled to an adjacent end of the discharge tube, not illustrated, which connects the discharge chamber 11 to the exterior of the compressor.

In the reciprocating compressors provided with a linear motor, the cylinder cap may incorporate a support element, not illustrated, which is configured to be coupled to the suspension system of the compression mechanism, inside the compressor housing. However, in the reciprocating compressors with a rotary motor, the cylinder cap does not need to incorporate said support element.

The discharge system of the present invention further provides a biasing means 40 located between the top end wall 25 of the hollow body 20 and the end wall 14 of the cylinder cap 10, in order to constantly and elastically force the hollow body 20 against the valve plate 3, minimizing the passage of the discharge gas to the interior of the cylinder cap 10, externally to the hollow body 20. The biasing means 40 forces the base end wall 24 against the valve plate 3, improving the securing and limiting (stopping) functions of the base end wall 24 in relation to the discharge valve 4. The biasing means 40 further improves the sealing of the hollow body 20 in relation to the gap 30.

In a non-limiting way of carrying out the present invention, the biasing means 40 is defined by a plate spring 41, generally formed by parallel rods joined by their ends 41a, the latter being each fitted externally to a respective top projection 25b of the top end wall 25 of the hollow body 20.

Although not illustrated herein, the top end wall 25 of the hollow body 20 may incorporate a plurality of top projections facing outwards of the hollow body 20, and the end wall 14 of the cylinder cap 10 may be internally provided with an equal plurality of recesses, inside which is fitted a respective top projection of the top end-wall 25, indexing, relative to each other, the hollow body 20 and the cylinder cap 10. In this embodiment, the plate spring 41 may have each of its ends fitted inside a respective top projection of the top end wall 25.

It should be understood that the discharge system of the present invention may be carried out independently of the constructive particularities of the cylinder cap, biasing means, etc.

In the illustrated constructive form, the hollow body 20 is formed of two parts 20a, 20b, one incorporating the base end wall 24 and the other incorporating the top end wall 25, said parts being seated against a common dividing wall 26 which divides the plenum 21 of the hollow body 20 into a first and into a second discharge chamber C1, C2, said dividing wall 26 presenting an opening 26a communicating both discharge chambers C1, C2.

Although not illustrated in the drawings, it is possible to provide a sealing means between the two parts 20a, 20b of the hollow body 20 and the common dividing wall 26, which sealing means may be defined in different manners, such as for example, by an adhesive film or by sealing gaskets.

As it may be observed in FIGS. 1 and 4, the part 20a of the hollow body 20 closer to the valve plate 3 presents an end edge 28a, facing the common dividing wall 26 and provided with at least two outer cutouts 29a configured to perform the function described below.

Figure 4:
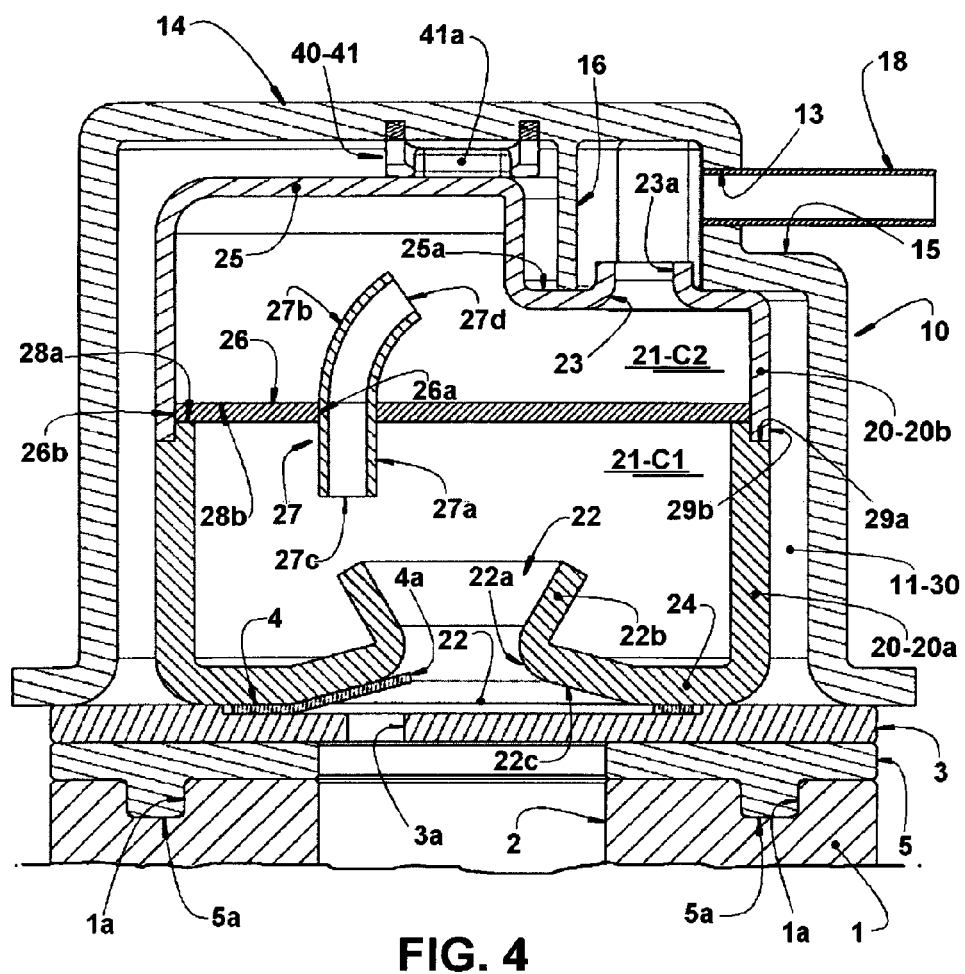
FIG. 4 represents a cross-sectional view of the assembly illustrated in FIG. 3, said cut being taken according to line IV-IV in said figure.

In the same FIGS. 1 and 4 it may be observed that the other part 20b of the hollow body 20 has an end edge 28b, facing the common dividing wall 26 and incorporating at least two axial projections 29b dimensioned to be fitted and each preferably retained into a respective outer cutout 29a of the other part 20a of the hollow body 20.

Still according to the embodiment illustrated in FIGS. 1 and 4, the common dividing wall 26 presents at least two radial cutouts/notches 26b dimensioned to allow the passage of the axial projections 29b of the part 20b of the hollow body 20, upon closing the latter.

It should be understood that the hollow body 20 may be formed in a single piece defining a single discharge chamber, or also formed in two or more parts, as illustrated, however having the dividing wall incorporated to one of said parts. The hollow body 20 may further present more than two discharge chambers in the interior thereof.

In the illustrated embodiment, the opening 26a of the dividing wall 26 receives, hermetically, a tube 27 which projects to the interior of the first discharge chamber C1, through a straight section 27a eccentric in relation to the inlet nozzle 22 of the hollow body 20, and to the interior of the second discharge chamber C2, through an arcuate section 27b. The tube 27 may be built and dimensioned in order to define an acoustic attenuator.

Although the illustrated tube 27 is obtained in a separate piece from the median wall 26, it should be understood that said tube may be provided in a single piece with said median wall.

It should be further understood that the median wall may be disposed in different positions, not necessarily horizontal or substantially horizontal, and may even be arranged in a substantially vertical or inclined manner. Furthermore, the first and the second discharge chambers C1, C2, may present equal or different volumes and also communicate with each other by more than one opening 26a or more than one tube 27. The first discharge chamber C1 receives, from the inlet nozzle 22 of the hollow body 20, the entire discharge flow coming from the compression chamber, said first discharge chamber C1 maintaining a constant fluid communication with the second discharge chamber C2, through the tube 27.

Said hollow body construction presenting two discharge chambers interconnected by a tube 27 provides, to the discharge system, an acoustic muffling function, of the volume-tube-volume type, in the interior of the cylinder cap 10. Thus, the thermally insulated discharge system of the present invention also acts as an acoustic muffler during the discharge of gas in the gas compression upon operation of the compressor.

The volume of each of the first and second discharge chambers C1, C2, as well as the determination of the dimensions of each tube 27 (length, shape, cross section) and the definition of its projecting extension to the interior of each chamber in which said tube acts, are defined in function of the thermal insulation effect to be achieved, however they may also be defined in function of the attenuation to be achieved and of the pulsation range to be attenuated. According to the present invention, the hollow body 20 may further present a plurality of discharge chambers located according to the same concept described for both discharge chambers illustrated in the drawings. According to a way of carrying out the present invention, the tube 27 presents a first end 27c and a second end 27d eccentrically located in the first and second discharge chambers C1, C2, with the first end 27c of the tube 27 being located eccentrically to the inlet nozzle 22 of the hollow body 20, and with the second end 27d of the tube 27 being located spaced from the gas outlet opening 22 of the hollow body 20. In turn, the gas outlet opening 22 is disposed in direct fluid communication with the gas outlet 13 of the cylinder cap 10. In the particular construction illustrated, the gas outlet opening 22 is provided located orthogonal to the gas outlet 13 of the cylinder cap 10 and connected to said gas outlet 13 by means of the tubular passage 16 provided internally to the end wall 14 of the cylinder cap 10.

It should be further observed that the constructive variations described herein may be presented individually, in particular constructions, or partially or totally combined to each other.

As described and illustrated, the subject thermal insulation system is distinguished from the known solutions, by promoting a substantial increase in the total resistance to the thermal exchange between the compressed gas contained inside the hollow body 20 and the environment internal to the compressor housing.

In the proposed solution, the provision of the hollow body 20, preferably formed in a thermal insulating material, such as plastic, causes the heat of the compressed gas contained within the hollow body to reach, by internal convection, the wall of the hollow body 20 and hence, by means of conduction through the material with which the hollow body 20 is built, the gap 30 defined between the hollow body 20 and the cylinder cap 10, and which defines an effective thermal insulation element against the heat that tends to migrate to the cylinder cap 10 and from the latter, by convection, to the interior of the hermetic housing of the compressor. This construction creates, in relation to the prior art, at least one additional thermal resistance means defined by the gap 30 between the hollow body 20 and the cylinder cap 10, which is not foreseen by the state of the art and also, preferably, a second additional thermal resistance means defined by the wall of the hollow body 20 when built in a thermal insulating material.

The present invention provides an improved thermal insulation, even if variations occur: in the value of the gap existing between the metallic wall of the cylinder cap 10 and the wall in insulating material of the hollow body 20; in the number of internal divisions of the hollow body 20; in the shape of the chambers inside the hollow body 20; and in the determination of the type of insulating material (for example, a composition formed of more than one material for the hollow body 20).

The invention claimed is:

1. A thermal insulation system for a discharge of a gas in a refrigeration compressor of a type which comprises: a cylinder crankcase defining a cylinder closed at one end by a valve plate provided with at least one discharge orifice operationally associated with at least one discharge valve, and defining, with the cylinder, a compression chamber; a cylinder cap having a gas outlet and an end wall opposed and seated to the valve plate in opposition to the compression chamber and inside which is defined a discharge chamber; a discharge tube communicating the gas outlet of the cylinder cap with an exterior of the compressor, the system being characterized in that it comprises a hollow body defining at least one plenum in its interior and mounted in an interior of the cylinder cap and maintaining, with the latter, a gap, said hollow body comprising: a base end wall to be seated against the valve plate in order to secure the at least one discharge valve within the valve plate, and to stop the at least one discharge valve, said base end wall preventing the direct contact of the valve plate with an internal volume of the hollow body, and provided with an inlet nozzle open to the discharge orifice of the valve plate; and a top end wall provided with an outlet nozzle comprising an outer tubular projection to be fitted in a tubular passage formed internally to the end wall of the cylinder cap, the outlet nozzle, its outer tubular projection and the tubular passage being open to the gas outlet of the cylinder cap, wherein the base end wall inlet nozzle includes an annular region surrounding a base opening, the annular region is inclined radially inwards and axially inwards of the hollow body.

2. The system, as set forth in claim 1, characterized in that the inlet nozzle of the hollow body comprises the base opening, provided in the base end wall, and the annular region forms a tubular projection which extends from the base end wall to the interior of the hollow body, around the base opening.

3. The system, as set forth in claim 1, characterized in that the outer tubular projection extends outwards of a lowered region provided in the top end wall of the hollow body, with the tubular passage being defined in the interior of the end wall.

4. The system, as set forth in claim 1, characterized in that it comprises a biasing means provided between the top end wall and the end wall of the cylinder cap and elastically forcing the hollow body against the valve plate.

5. The system, as set forth in claim 4, characterized in that the biasing means is defined by a plate spring.

6. The system, as set forth in claim 5, characterized in that the top end wall incorporates a plurality of top projections facing out of the hollow body, with the plate spring presenting opposite ends, each being fitted in a respective top projection of the top end wall of the hollow body.

7. The system, as set forth in claim 1, characterized in that the hollow body is formed in two parts, one incorporating the base end wall and the other incorporating the top end wall, said parts being seated against a common dividing wall which divides the plenum of the hollow body into a first and a second discharge chamber, said dividing wall presenting at least one opening communicating both discharge chambers.

8. The system, as set forth in claim 7, characterized in that the opening of the dividing wall comprises at least one tube projecting into the first discharge chamber, through a straight section eccentric in relation to the inlet nozzle, and into the second discharge chamber, through an arcuate section defining an acoustic attenuator.

9. The system, as set forth in claim 1, characterized in that the hollow body is formed from a thermal insulating material.

10. A refrigeration compressor, characterized in that it comprises a thermal insulation system for the discharge of gas, as defined in claim 1.

* * * * *